(12) United States Patent
Lorach

(10) Patent No.: US 7,724,254 B1
(45) Date of Patent: May 25, 2010

(54) ISO-SURFACE TESSELATION OF A VOLUMETRIC DESCRIPTION

(75) Inventor: Tristan Lorach, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 684 days.

(21) Appl. No.: 11/684,761

(22) Filed: Mar. 12, 2007

(51) Int. Cl.
*G06T 17/00* (2006.01)
(52) U.S. Cl. ............... 345/424; 345/419; 345/420; 345/423; 345/581; 382/128; 382/131; 382/133; 382/154; 382/199; 703/2
(58) Field of Classification Search ................ 345/419, 345/420, 423, 424, 581; 382/128, 131, 133, 382/154, 199; 703/2; 600/407
See application file for complete search history.

(56) References Cited

U.S. PATENT DOCUMENTS 7,274,810 B2 * 9/2007 Reeves et al. ............... 382/128
7,529,395 B2 * 5/2009 Cathier et al. ............... 382/128
2004/0257375 A1 * 12/2004 Cowperthwaite ............ 345/582
2006/0094951 A1 * 5/2006 Dean et al. .................. 600/407
2008/0002873 A1 * 1/2008 Reeves et al. ............... 382/133
2008/0205717 A1 * 8/2008 Reeves et al. ............... 382/128

OTHER PUBLICATIONS

Nelson et al. "Ray-Tracing Polymorphic Multidomain Spectral/hp Elements for Isosurface Renderin", IEEE Jan. 2006.*
Cebral et al. "A Feature-Preserving Volumetric Technique to merge Surface Triangulations", International Journal for Numerical Methods in Engineering, Apr. 2001.*

* cited by examiner

*Primary Examiner*—Kimbinh T Nguyen
(74) *Attorney, Agent, or Firm*—Patterson & Sheridan, LLP

(57) ABSTRACT

A multi-threaded graphics processor is configured to generate a tessellated iso-surface from a volumetric description using slices of values that are stored in render targets. The volumetric description can be a complex mathematic equation, a sum of metaballs, a pre-computed scalar field represented as a 3D volume texture, or a rendered volume. Slices are aligned along an axis and spaced before being intersected with the volume to determine iso-surface intersections for the x, y, and z axes. The intersections are stored in render targets and are processed by a shader program to produce a tessellated iso-surface.

20 Claims, 10 Drawing Sheets

PRIOR ART

ISO-SURFACE TESSELATION OF A VOLUMETRIC DESCRIPTION

BACKGROUND OF THE INVENTION

1. Field of the Invention

The present invention generally relates to tesselating iso-surfaces and more specifically to using a graphics processor to produce a tessellated iso-surface from a volumetric description.

2. Description of the Related Art

Iso-surfaces are used to visually represent a set of points from a scalar three-dimensional (3D) field that have a constant value, such that a function of coordinates x, y, and z, f(x,y,z) equals a constant. Iso-surfaces have applications in medical imaging, computational fluid dynamics, astrophysics, molecular modeling, weather forecasting, oil exploration, and finite element analysis. Iso-surfaces also have many potential applications in 3D graphics games and special effects for film production. Iso-surfaces may represent a surface of constant pressure, temperature, velocity, or density.

Conventionally, tessellated iso-surfaces are generated using a central processing unit (CPU) and consume substantial CPU resources. Volumetric data is represented as a sequence of slices of scalar field data. FIG. 1A illustrates a conceptual diagram of prior art slices of values sampled from volumetric data including objects 110, 120, and 130. A slice 101 intersects object 110 and 120, resulting in object slice values 112 and 122 that are sampled by a two-dimensional grid represented by slice 101. Similarly, slice 102 intersects object 130, resulting in object slice values 132.

Conventional techniques known to those skilled in the art, such as the marching cubes algorithm are used to sample the volume data and produce the slices. A lattice of two-dimensional cube arrays is used to sample volumetric data where each cube has eight sample locations, i.e., a sample at each cube corner. The marching cubes algorithm determines the polygon(s) required to represent the iso-surface that passes through each cube.

FIG. 1B illustrates prior art cube intersection patterns according to the marching cubes algorithm. Since each cube has 8 sample locations (vertices), there are $2^8=256$ different ways that an iso-surface can intersect a cube, forming as many as four triangles and including the case where there is no intersection. Accounting for rotations and reflections, there are only 15 unique intersection patterns, as shown in FIG. 1B. Application of the marching cubes algorithm provides the intersection pattern and vertex positions (x,y,z) for each triangle formed by the intersections. The vertices can be used to compute a vertex normal vector for each vertex position that is used to render the iso-surface.

As previously described, tessellated iso-surfaces generated using the marching cubes algorithm consume substantial CPU resources. Accordingly, what is needed in the art is a high-performance system and method for generating a tessellated iso-surface from a volumetric description and the ability to offload the tessellation computations from the CPU.

SUMMARY OF THE INVENTION

A multi-threaded graphics processor is configured to generate a tessellated iso-surface from a volumetric description using slices of values that are stored in render targets in order to offload the tessellation computations from the CPU. The volumetric description can be a complex mathematic equation, a sum of metaballs, a pre-computed scalar field represented as a 3D volume texture, or a rendered volume. The multi-threaded graphics processor may be used to pre-compute the scalar field and store it as a 3D volume texture. Similarly, the multi-threaded graphics processor may combine mathematical functions, including meatballs to produce the volumetric description.

Slices are aligned along an axis and spaced before being intersected with the volume to determine sample values for the slices. The computations needed to determine the sample values may be reduced by using bounding boxes to define regions of the volumetric description where data exists. The computations for multiple cube positions within adjacent slices may be performed for three axes in parallel by the multi-threaded graphics processor. The intersection positions for the iso-surface and the cube edges are computed in parallel by the multi-threaded graphics processor and stored in render targets. Storing the intersections avoid redundant computations since the intersection positions can be used for shared cube edges. The intersection pattern is determined and encoded for the cubes formed by the slices. The intersections and intersection pattern are processed by a shader program to produce a tessellated iso-surface. The multi-threaded graphics processor can be used to render the tessellated iso-surface for visualization purposes.

Various embodiments of a method of the invention for generating a tessellated iso-surface from a volumetric description include preparing the volumetric description to provide volumetric data, computing and storing weights in a render target in graphics memory, determining iso-surface intersection patterns for a cube array, constructing triangles using the weights and the intersection patterns to produce the tessellated iso-surface, and storing the triangles in a manner allowing retrieval of the tessellated iso-surface. The computed weights correspond to edges between vertices positioned at intersections of the volumetric data and edges of cubes in the cube array that are formed by a first slice intersecting the volumetric data and a second slice intersecting the volumetric data.

Various embodiments of the invention for generating a tessellated iso-surface from a volumetric description include a memory and a parallel processing unit coupled to the memory. The memory is configured to store a first gradient render target, a second gradient render target, a weight render target, and a tessellated iso-surface render target. The parallel processing unit is configured to simultaneously process volumetric data representing the volumetric description by preparing the volumetric description to provide volumetric data, computing and storing weights in a render target in graphics memory, determining iso-surface intersection patterns for a cube array, constructing triangles using the weights and the intersection patterns to produce the tessellated iso-surface, and storing the triangles in the tessellated iso-surface render target. The parallel processing unit is further configured to compute the weights using the first gradient render target and the second gradient render target, where the weights corresponding to edges between vertices positioned at intersections of the volumetric data and edges of cubes in the cube array formed by a first slice intersecting the volumetric data and a second slice intersecting the volumetric data.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 2A:
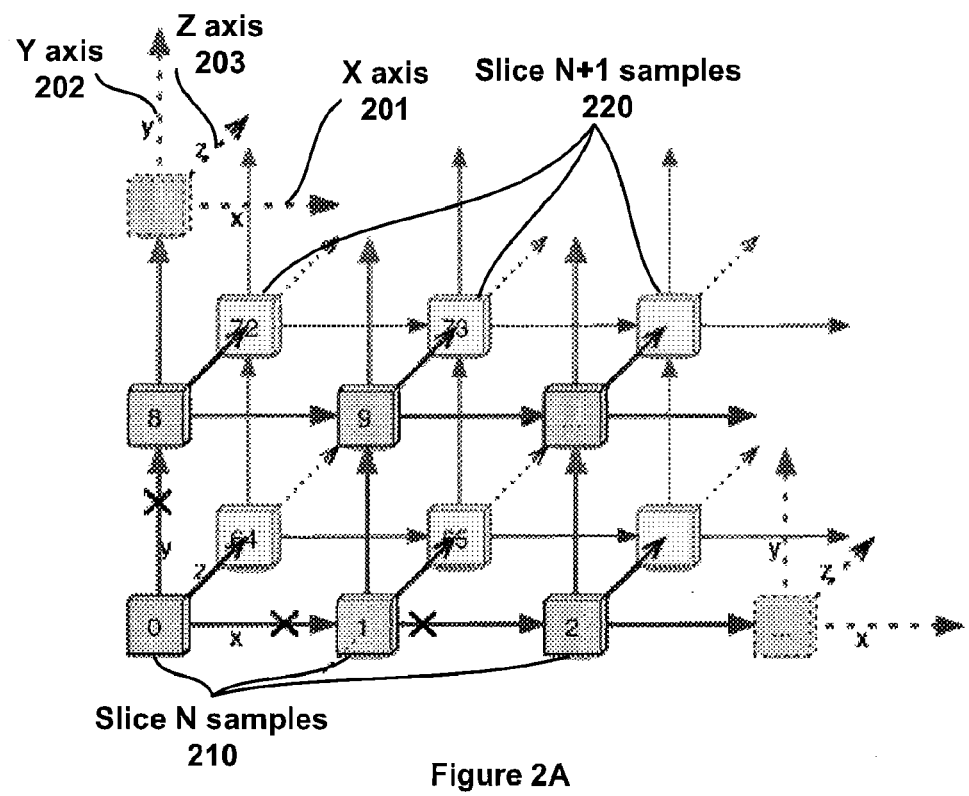
FIG. 2A illustrates slices sampled by three axes that form cubes between adjacent slices in accordance with one or more aspects of the present invention.

FIG. 2A illustrates slices sampled by three axes that form cubes between adjacent slices, in accordance with one or more aspects of the present invention. The cubes are aligned along an x axis 201, a y axis 202, and z axes and 203, and a value of the volumetric data is sampled at each cube vertex. A first slice in the x-y plane includes four corners of each cube and is shown as slice N samples 210. A neighboring slice at a different z value includes the remaining four corners of each cube and is shown as slice N+1 samples 220. Intersections of an iso-surface with the cube edges are shown as Xs between cubes in the first slice. Importantly, the cube vertex values for slice N+1 samples 220 are reused when a subsequent slice (not shown) is sampled. Therefore, the same vertex values are not recomputed and computation efficiency may be improved.

Figure 1A:
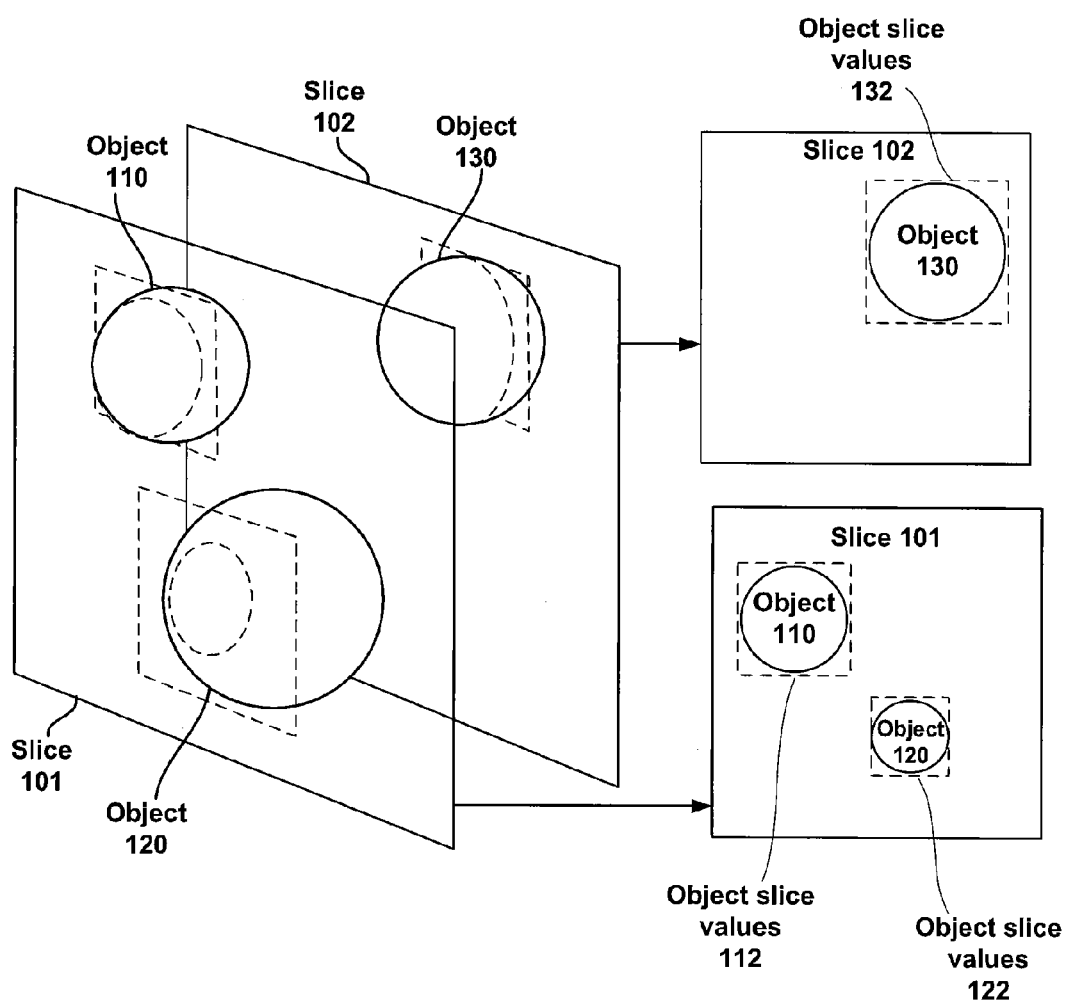
FIG. 1A illustrates a conceptual diagram of prior art slices of values sampled from volumetric data.
Figure 1B:
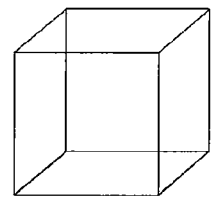
FIG. 1B illustrates prior art cube intersection patterns according to the marching cubes algorithm.
Figure 1B:
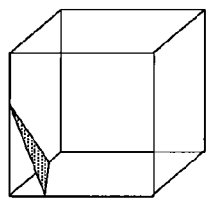
Figure 1B:
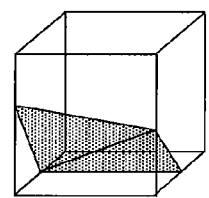
Figure 1B:
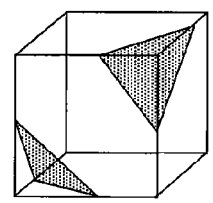
Figure 1B:
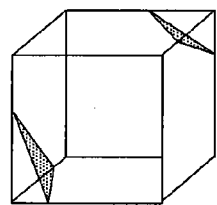
Figure 1B:
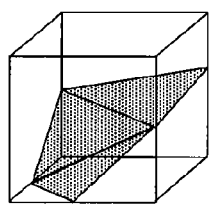
Figure 1B:
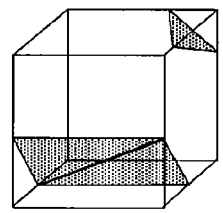
Figure 1B:
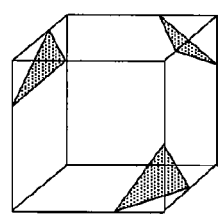
Figure 1B:
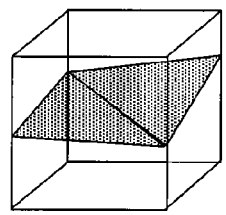
Figure 1B:
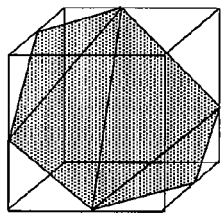
Figure 1B:
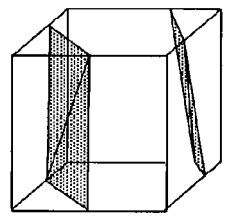
Figure 1B:
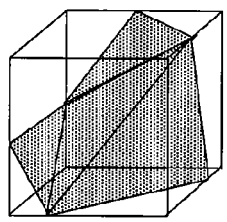
Figure 1B:
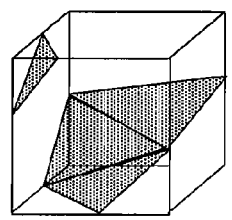
Figure 1B:
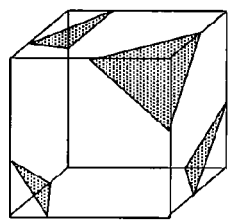
Figure 1B:
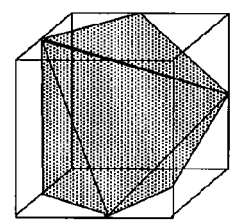
Figure 2B:
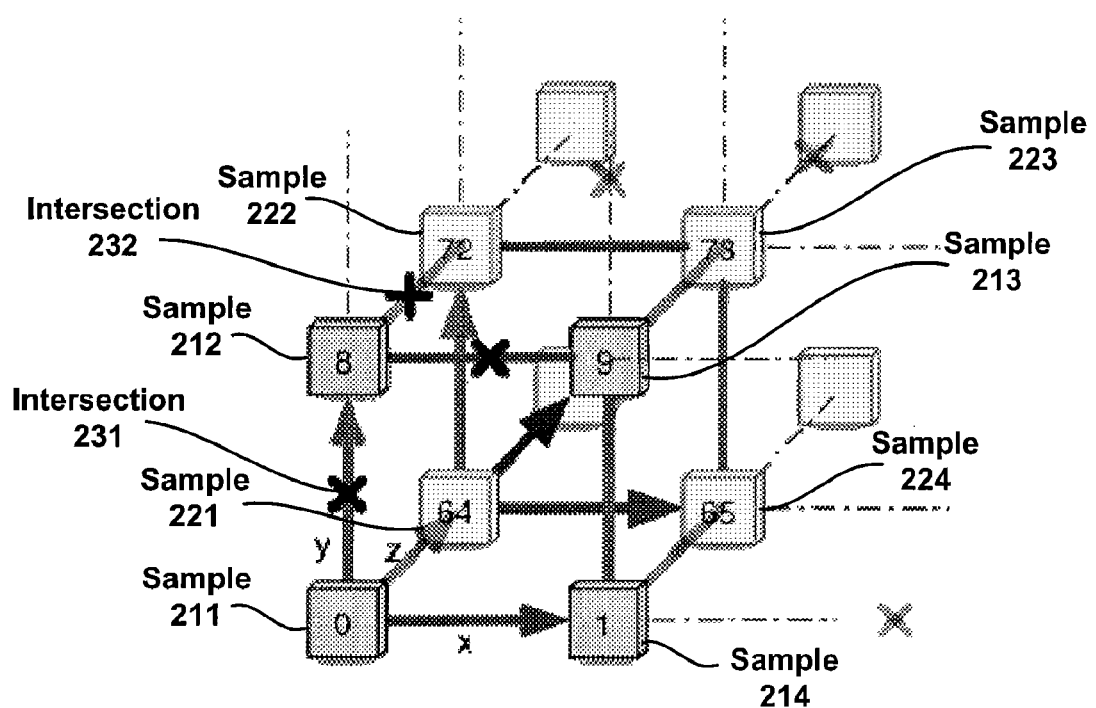
FIG. 2B illustrates surface intersections forming an iso-surface in accordance with one or more aspects of the present invention.

FIG. 2B illustrates surface intersections forming an iso-surface, in accordance with one or more aspects of the present invention. A cube within a cube lattice is defined by samples 211, 212, 213, and 214 in a first slice and samples 221, 222, 223, and 224 in a second slice. Iso-surface intersections 231 and 232 each lie between two samples forming edges of the cube. The intersections between the iso-surface and cube edge intersections are computed separately and in parallel for each axis. Therefore, redundant computations are avoided since the intersections are stored as weights that are used to produce the tessellated iso-surface. The intersections are also used to determine the intersection pattern according to the marching cube patterns shown in FIG. 1B.

The volumetric description can be represented as a complex mathematic equation, such as a scalar field s=F(x, y, z) that is a pure mathematic equation or a sum of metaballs. A fragment shader program executed by the multi-threaded graphics processor can be configured to compute the complex mathematic equation. Alternatively, the volumetric description can be represented as a pre-computed scalar field, such as a set of scanned scalar values that are packed in a 3D volume texture. Finally, 3D volume textures and/or primitives can be combined by the multi-threaded graphics processor to produce the volumetric description using shading and blending capabilities accessed via a shader program. Additionally, a related vector field, such as vectors used to compute normals of an iso-surface, may be included with the volumetric description, V=F(x, y, z). In other embodiments of the present invention, functions for additional parameters are also included with the volumetric description.

Figure 3:
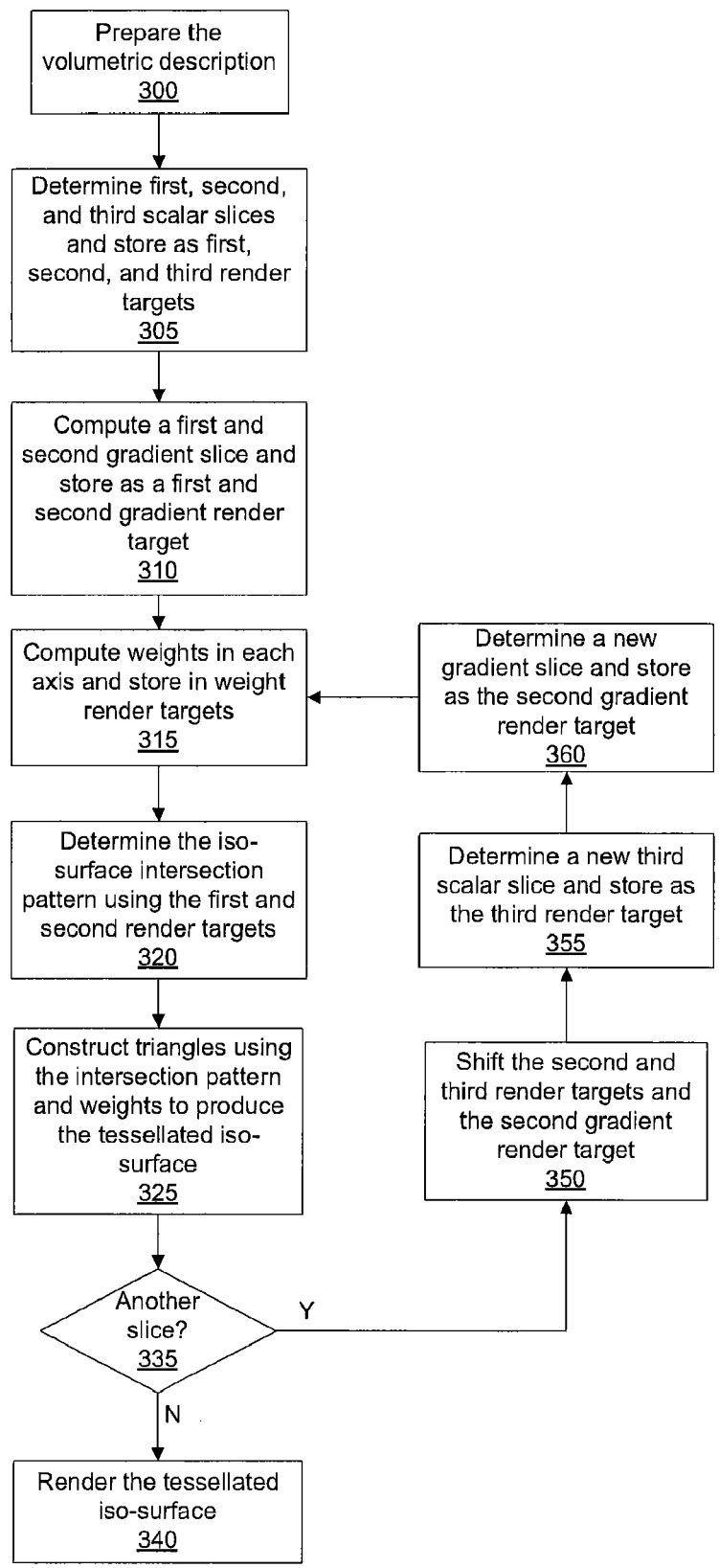
FIG. 3 is a flow diagram of method steps for producing a tessellated iso-surface from a volumetric description in accordance with one or more aspects of the present invention.

FIG. 3 is a flow diagram of method steps for producing a tessellated iso-surface from a volumetric description, in accordance with one or more aspects of the present invention. In step 300 the volumetric description is prepared. As previously described, the volumetric description can be generated by the multi-threaded graphics processor or the volumetric description can be provided directly. In step 305 samples for first, second, and third scalar slices are determined by the multi-threaded graphics processor and stored as first, second, and third render targets. The multi-threaded graphics processor determines the scalar field values for the first, second, and third slices by intersecting the 3D scalar field defined by the volumetric description by the 2D slices. Typically, the slices are aligned along the z axis in world space with equal spacing to produce a regular tessellation that can be stored as a mesh representing the iso-surface. Each slice is defined by a plane equation that specifies the intersection of the slice and the z axis. The render target that stores the scalar field values for the slices may match the resolution of 3D textures that are supported by the multi-threaded graphics processor since the volume scalar field can be read as a texture map in subsequent steps. In some embodiments of the present invention, scalar field values for the slices are provided as the volumetric description and step 305 is omitted.

In step 310 the multi-threaded graphics processor reads the first, second, and third render targets and computes a first and second gradient slice, where the gradient field stored in the first gradient slice is the difference between the second and first slices and the gradient field stored in the second gradient slice is the different between the third and second slices. The gradient slices are stored as gradient render targets. The multi-threaded graphics processor is configured to compute gradient slices using a fragment shader program to simultaneously process the scalar fields. In some embodiments of the present invention, gradient fields are provided as the volumetric description and step 310 is omitted.

In step 315 the multi-threaded graphics processor uses the two gradient fields computed in step 310 to compute weights corresponding to the intersections of the iso-surface with each axis, x, y, and z. The weights specify intersection positions of the iso-surface between adjacent sample positions, i.e. cube corners of an array of cubes formed by the pair of gradient slices. Valid weight values lie between 0 and 1, inclusive. A weight that is not a valid value (less than 0 or greater than 1) indicates that a valid intersection does not exist between the two sample positions. The weights for each axis are computed using the following equations:

$$Wx\text{-axis}=(\text{isolevel}-v0)/(vx-v0),$$

$$Wy\text{-axis}=(\text{isolevel}-v0)/(vy-v0), \text{ and}$$

$$Wz\text{-axis}=(\text{isolevel}-v0)/(vz-v0),$$

where isolevel is the slice, v0 is the vertex of the cube corner, and vx, vy, and vz are the edge intersections. As described further herein, the weights are used to determine vertex values for the tessellated iso-surface, where each value is a vertex position along one of the axes. The intersection positions where the iso-surface intersects an edge of a cube formed by adjacent sample positions become vertices of the tessellated iso-surface.

The weights for each axis are stored in separate weight render targets, such that a first render target stores x axis intersections, a second render target stores y axis intersections, and a third render target stores z axis intersections. In other embodiments of the present invention, the weights are stored as different components, for example in three color component channels (red, green, blue) within a single render target. The multi-threaded graphics processor is configured to compute the weights using a fragment shader program to simultaneously process each axis for multiple cubes. Processing the samples and slices in parallel allows for adjacent cubes to share computations for common edges, reducing redundant computations and improving processing efficiency.

In step 320 the multi-threaded graphics processor computes the iso-surface intersection pattern (the patterns are shown in FIG. 1B) for each cube defined by the sample positions of the first and second slices (determined in step 305), according to the marching cube algorithm. Specifically, the scalar values for each cube corner are used to determine the intersection pattern for each cube. The scalar values indicate which side of the iso-surface each of the eight cube corners lies. The inside/outside state (of the iso-surface) are encoded and used to read the corresponding iso-surface intersection pattern from a table. The pattern specifies the number of triangles that are needed to tessellate the intersection of the iso-surface and the cube. In some embodiments of the present invention, the intersection patterns, for an array of cubes defined by the first and second slices, are stored in a render target. The combination of triangle vertices for all of the cubes in a 3D volume including the volumetric data forms the tessellated iso-surface. A fragment shader program is executed by the multi-threaded graphics processor to compute the intersection pattern.

In step 325 the fragment shader program constructs triangles using the intersection pattern, weights, and scalar field values for the first and second slices to produce the tessellated iso-surface. Triangles are constructed by using the intersection pattern to select any edges of a cube that are intersected by the iso-surface. A triangle vertex is computed for each intersected edge by using the weights to interpolate between scalar field values (from the first and second slices) of the edge endpoints for each axis. The selected vertices are stored as a list of triangles in a render target, producing a render target that stores the tessellated iso-surface. As described in conjunction with FIG. 9, the list of triangles may be processed to cull degenerate triangles before being stored in the render target.

In step 335 the multi-threaded graphics processor determines if another slice should be processed for the volumetric description, and, if so, in step 350 the multi-threaded graphics processor effectively shifts the third and second render targets storing scalar values so that they are used as the second and first render targets, respectively. In step 350 the multi-threaded graphics processor also shifts the second gradient render target so that it is used as the first gradient render target, and returns to step 315 to produce a new third render target and a new second gradient render target. In this manner, the computed scalar values for half of the cube corners in the cube array formed by the first and second slices is reused to form a subsequent cube array in a cube lattice. Similarly, half of the gradient values are also reused for each subsequent cube array.

In step 355 samples for the third scalar slice are determined by the multi-threaded graphics processor and stored as the third render target, overwriting the no-longer-needed first render target. In step 360 the multi-threaded graphics processor reads the second and third render targets and computes a second gradient slice, where the gradient field stored in the second gradient slice is the difference between the third and second scalar slices. The second gradient field is stored as a second gradient render target, overwriting the no-longer-needed first gradient render target. The method then proceeds to step 315 to process the scalar render targets and gradient render targets and generate additional triangles for the iso-surface.

If, in step 335 the multi-threaded graphics processor determines that another slice should not be processed for the volumetric description, then in step 340 the multi-threaded graphics processor renders the tessellated iso-surface to produce an image. In other embodiments of the present invention, the tessellated iso-surface is stored in graphics memory or system memory. The tessellated iso-surface can be read and rendered at a later time by the multi-threaded graphics processor or another processing device.

System Overview

Figure 4:
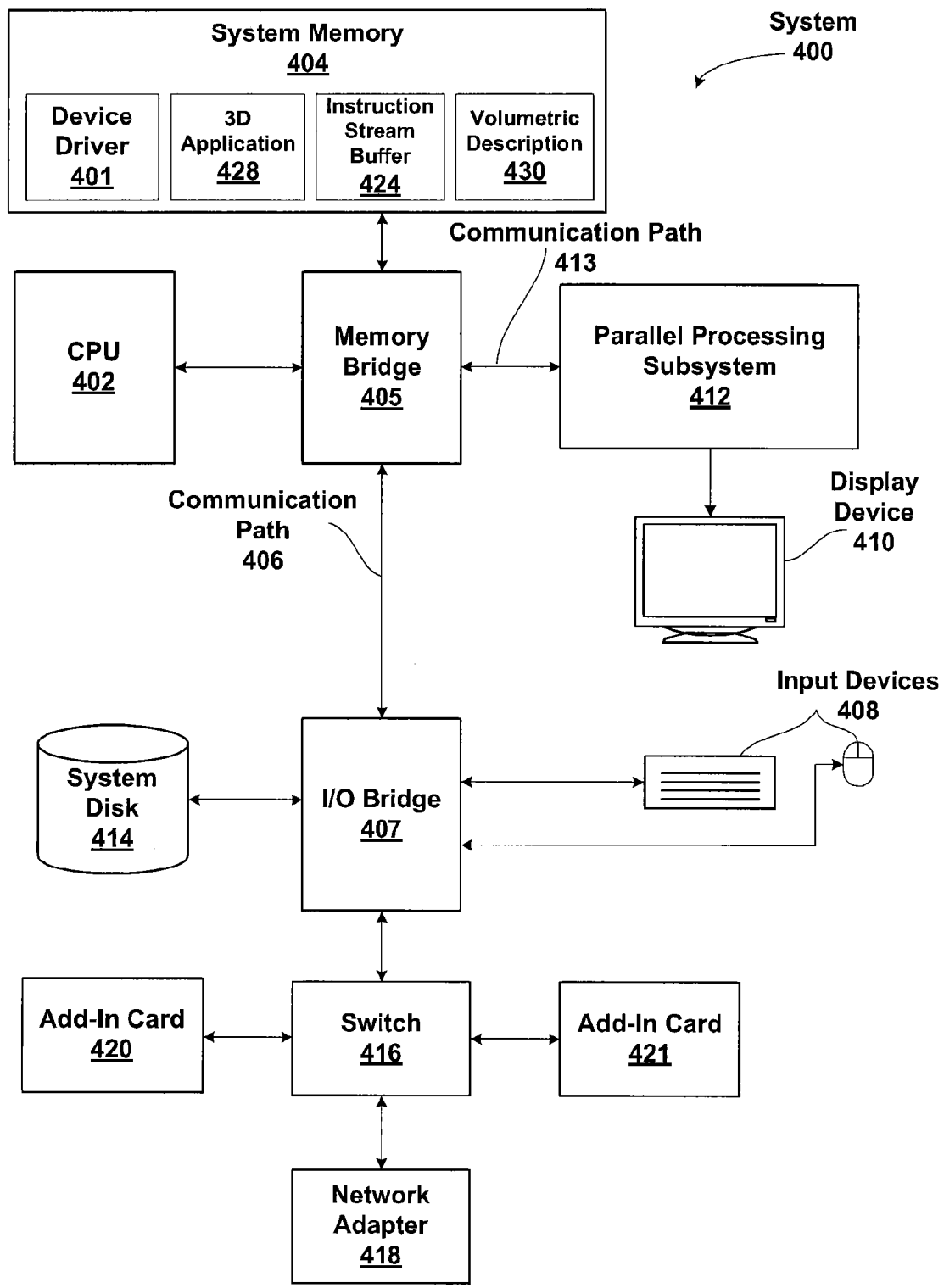
FIG. 4 is a block diagram illustrating a computer system configured to implement one or more aspects of the present invention.

FIG. 4 is a block diagram illustrating a computer system 400 configured to implement one or more aspects of the present invention. Computer system 400 includes a central processing unit (CPU) 402 and a system memory 404 communicating via a bus path that includes a memory bridge 405. System ememory 404 includes a 3D application 428 that is a computer software program configured for execution by system 400. In some embodiments of the present invention 3D application 428 generates volumetric description 430 while in other embodiments of the present invention, volumetric description 430 is provided by another system and stored in system memory 404 for use by 3D application 428. Examples of 3D application 428 known to those skilled in the art include applications for physics simulation, fluid dynamics simulation, medical imaging, and 3D graphics.

System memory 404 also includes a device driver 401 that is configured to provide an instruction stream buffer 424 that specifies the location of data, such as volumetric description 430, and program instructions to parallel processing subsystem 412. The program instructions and data are produced by 3D application 428 and may be stored in system memory 404 or memory within other devices of system 400. Device driver 401 is executed by CPU 402 to translate instructions for execution by parallel processing subsystem 412 based on the specific capabilities of parallel processing subsystem 412. The instructions may be specified by an application programming interface (API) which may be a conventional graphics API such as Direct3D or OpenGL.

Memory bridge 405, which may be, e.g., a Northbridge chip, is connected via a bus or other communication path 406 (e.g., a HyperTransport link) to an I/O (input/output) bridge 407. I/O bridge 407, which may be, e.g., a Southbridge chip, receives user input from one or more user input devices 408 (e.g., keyboard, mouse) and forwards the input to CPU 402 via path 406 and memory bridge 405. A parallel processing subsystem 412 is coupled to memory bridge 405 via a bus or other communication path 413 (e.g., a PCI Express, Accelerated Graphics Port, or HyperTransport link); in one embodiment parallel processing subsystem 412 is a graphics subsystem that delivers pixels to a display device 410 (e.g., a conventional CRT or LCD based monitor). A system disk 414 is also connected to I/O bridge 407. A switch 416 provides connections between I/O bridge 407 and other components such as a network adapter 418 and various add-in cards 420 and 421. Other components (not explicitly shown), including USB or other port connections, CD drives, DVD drives, film recording devices, and the like, may also be connected to I/O bridge 407. Communication paths interconnecting the various components in FIG. 4 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols as is known in the art.

Figure 5:
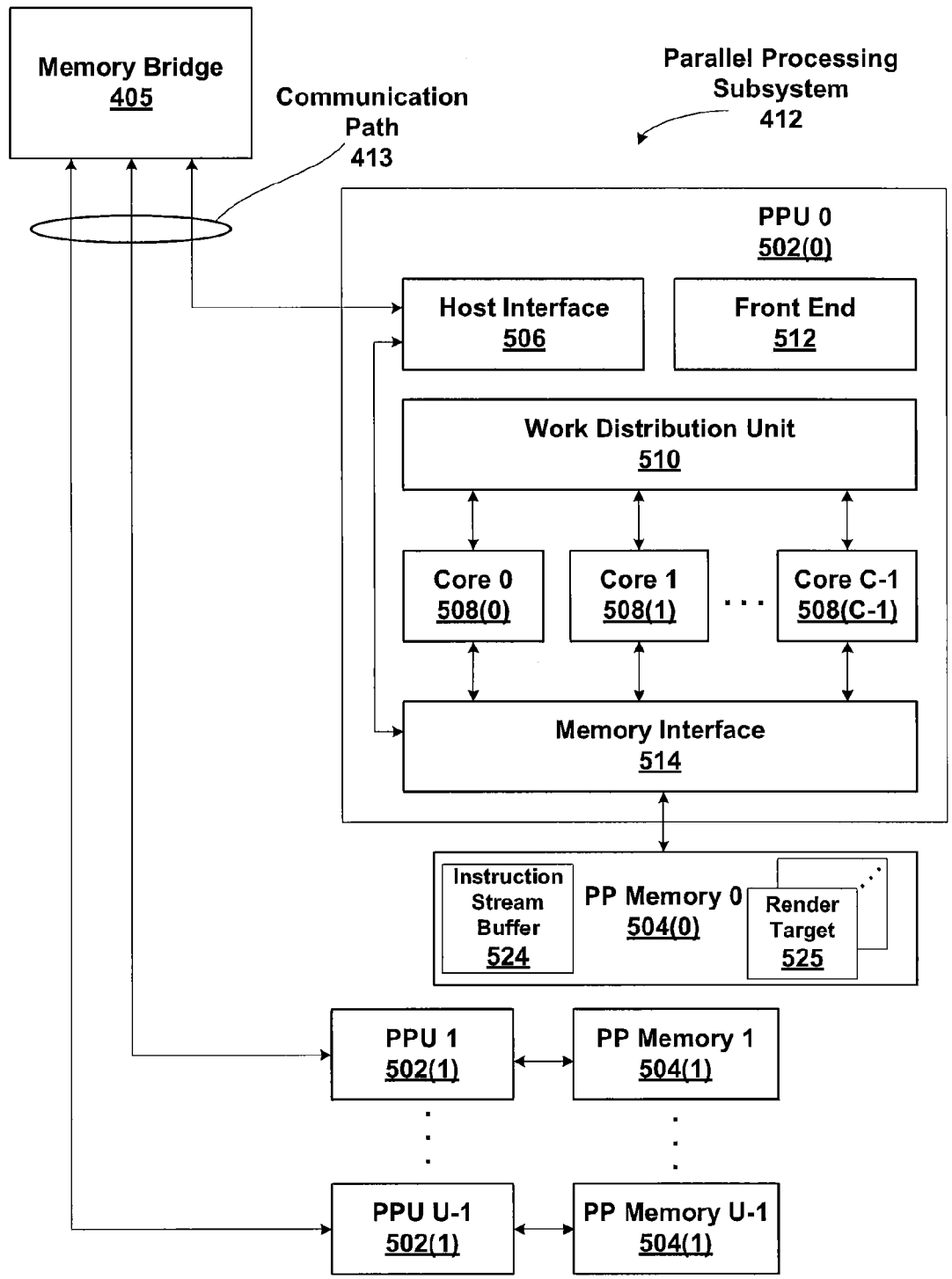
FIG. 5 is a block diagram of a parallel processing subsystem for the computer system of FIG. 4 in accordance with one or more aspects of the present invention.

An embodiment of parallel processing subsystem 412 is shown in FIG. 5. Parallel processing subsystem 412 includes one or more parallel processing units (PPUs) 502, each of which is coupled to a local parallel processing (PP) memory 504. An instruction stream buffer 524 that specifies the location of volumetric description 430 and program instructions determined by 3D application 428 for execution by each PPU 502 may be stored in each PP memory 504. In general, a parallel processing subsystem includes a number U of PPUs, where U≧4. (Herein, multiple instances of like objects are denoted with reference numbers identifying the object and parenthetical numbers identifying the instance where needed.) PPUs 502 and PP memories 504 may be implemented, e.g., using one or more integrated circuit devices such as programmable processors, application specific integrated circuits (ASICs), and memory devices.

As shown in detail for PPU 502(0), each PPU 502 includes a host interface 506 that communicates with the rest of system 400 via communication path 413, which connects to memory bridge 405 (or, in one alternative embodiment, directly to CPU 402). In one embodiment, communication path 413 is a PCI-E link, in which dedicated lanes are allocated to each PPU 502 as is known in the art. Other communication paths may also be used. Host interface 506 generates packets (or other signals) for transmission on communication path 413 and also receives all incoming packets (or other signals) from communication path 413 and directs them to appropriate components of PPU 502. For example, commands related to processing tasks may be directed to a front end unit 512 while commands related to memory operations (e.g., reading from or writing to PP memory 504) may be directed to a memory interface 514. Host interface 506, front end unit 512, and memory interface 514 may be of generally conventional design, and a detailed description is omitted as not being critical to the present invention.

Each PPU 502 advantageously implements a highly parallel processor. As shown in detail for PPU 502(0), a PPU 502 includes a number C of cores 508, where C≧4. Each processing core 508 is capable of executing a large number (e.g., tens or hundreds) of threads concurrently, where each thread is an instance of a program; one embodiment of a multithreaded processing core 508 is described below. Cores 508 receive processing tasks to be executed via a work distribution unit 510, which receives commands defining processing tasks from a front end unit 512. Work distribution unit 510 can implement a variety of algorithms for distributing work. For instance, in one embodiment, work distribution unit 510 receives a "ready" signal from each core 508 indicating whether that core has sufficient resources to accept a new processing task. When a new processing task arrives, work distribution unit 510 assigns the task to a core 508 that is asserting the ready signal; if no core 508 is asserting the ready signal, work distribution unit 510 holds the new processing task until a ready signal is asserted by a core 508.

Cores 508 communicate with memory interface 514 to read from or write to various external memory devices. In one embodiment, memory interface 514 includes an interface adapted to communicate with local PP memory 504, as well as a connection to host interface 506, thereby enabling the cores to communicate with system memory 404 or other memory that is not local to PPU 502. Memory interface 514 can be of generally conventional design, and a detailed description is omitted.

Cores 508 can be programmed to execute processing tasks relating to a wide variety of applications, including but not limited to linear and nonlinear data transforms, filtering of video and/or audio data, modeling operations (e.g., applying laws of physics to determine position, velocity and other attributes of objects), image rendering operations (e.g., vertex shader, geometry shader, and/or pixel shader programs), and so on. PPUs 502 may transfer data from system memory 404 and/or local PP memories 504 into internal (on-chip) memory, process the data, and write result data back to system memory 404 and/or local PP memories 504, where such data can be accessed by other system components, including, e.g., CPU 402 or another parallel processing subsystem 412.

Referring again to FIG. 4, in some embodiments, some or all of PPUs 502 in parallel processing subsystem 412 are graphics processors with rendering pipelines that can be configured to perform various tasks related to generating pixel data, including iso-surfaces from volumetric data supplied by instruction stream buffer 424 via memory bridge 405 and bus 413, interacting with local PP memory 504 to store and update pixel data, delivering pixel data to display device 410, memory bridge 405, and the like. In addition to system memory 404 or other storage resources within parallel processing subsystem 412, local PP memory 504, can be used as graphics memory including one or more render targets 525, e.g., a conventional frame buffer, rendered texture maps, rendered volumetric data, and the like. Local PP memory 540 can also store instruction stream buffer 524, texture maps, and the like. In some embodiments, PP subsystem 412 may include one or more PPUs 502 that operate as graphics processors and one or more other PPUs 502 that are used for general-purpose computations. The PPUs may be identical or different, and each PPU may have its own dedicated PP memory device(s) or no dedicated PP memory device(s).

In operation, CPU 402 is the master processor of system 400, controlling and coordinating operations of other system components. In particular, CPU 402 issues commands that control the operation of PPUs 502. In some embodiments, CPU 402 writes a stream of commands for each PPU 502 to a pushbuffer (not explicitly shown in FIG. 4) that is specified by instruction stream buffer 424 or 524, and which may be located in system memory 404, PP memory 504, or another storage location accessible to both CPU 402 and PPU 502.

PPU 502 reads the command stream from the pushbuffer and executes commands asynchronously with operation of CPU 402.

It will be appreciated that the system shown herein is illustrative and that variations and modifications are possible. The connection topology, including the number and arrangement of bridges, may be modified as desired. For instance, in some embodiments, system memory 404 is connected to CPU 402 directly rather than through a bridge, and other devices communicate with system memory 404 via memory bridge 405 and CPU 402. In other alternative topologies, parallel processing subsystem 412 is connected to I/O bridge 407 or directly to CPU 402, rather than to memory bridge 405. In still other embodiments, I/O bridge 407 and memory bridge 405 might be integrated into a single chip. The particular components shown herein are optional; for instance, any number of add-in cards or peripheral devices might be supported. In some embodiments, switch 416 is eliminated, and network adapter 418 and add-in cards 420, 421 connect directly to I/O bridge 407.

The connection of PPU 502 to the rest of system 400 may also be varied. In some embodiments, PP system 412 is implemented as an add-in card that can be inserted into an expansion slot of system 400. In other embodiments, a PPU 502 can be integrated on a single chip with a bus bridge, such as memory bridge 405 or I/O bridge 407. In still other embodiments, some or all elements of PPU 502 may be integrated on a single chip with CPU 402.

A PPU may be provided with any amount of local PP memory, including no local memory, and may use local memory and system memory in any combination. For instance, a PPU 502 can be a graphics processor in a unified memory architecture (UMA) embodiment; in such embodiments, little or no dedicated graphics (PP) memory is provided, and PPU 502 would use system memory exclusively or almost exclusively. In UMA embodiments, a PPU may be integrated into a bridge chip or processor chip or provided as a discrete chip with a high-speed link (e.g., PCI-E) connecting the PPU to system memory, e.g., via a bridge chip.

As noted above, any number of PPUs can be included in a parallel processing subsystem. For instance, multiple PPUs can be provided on a single add-in card, or multiple add-in cards can be connected to communication path 413, or one or more of the PPUs could be integrated into a bridge chip. The PPUs in a multi-PPU system may be identical to or different from each other; for instance, different PPUs might have different numbers of cores, different amounts of local PP memory, and so on. Where multiple PPUs are present, they may be operated in parallel to process data at higher throughput than is possible with a single PPU.

Systems incorporating one or more PPUs may be implemented in a variety of configurations and form factors, including desktop, laptop, or handheld personal computers, servers, workstations, game consoles, embedded systems, and so on.

Core Overview

Figure 6:
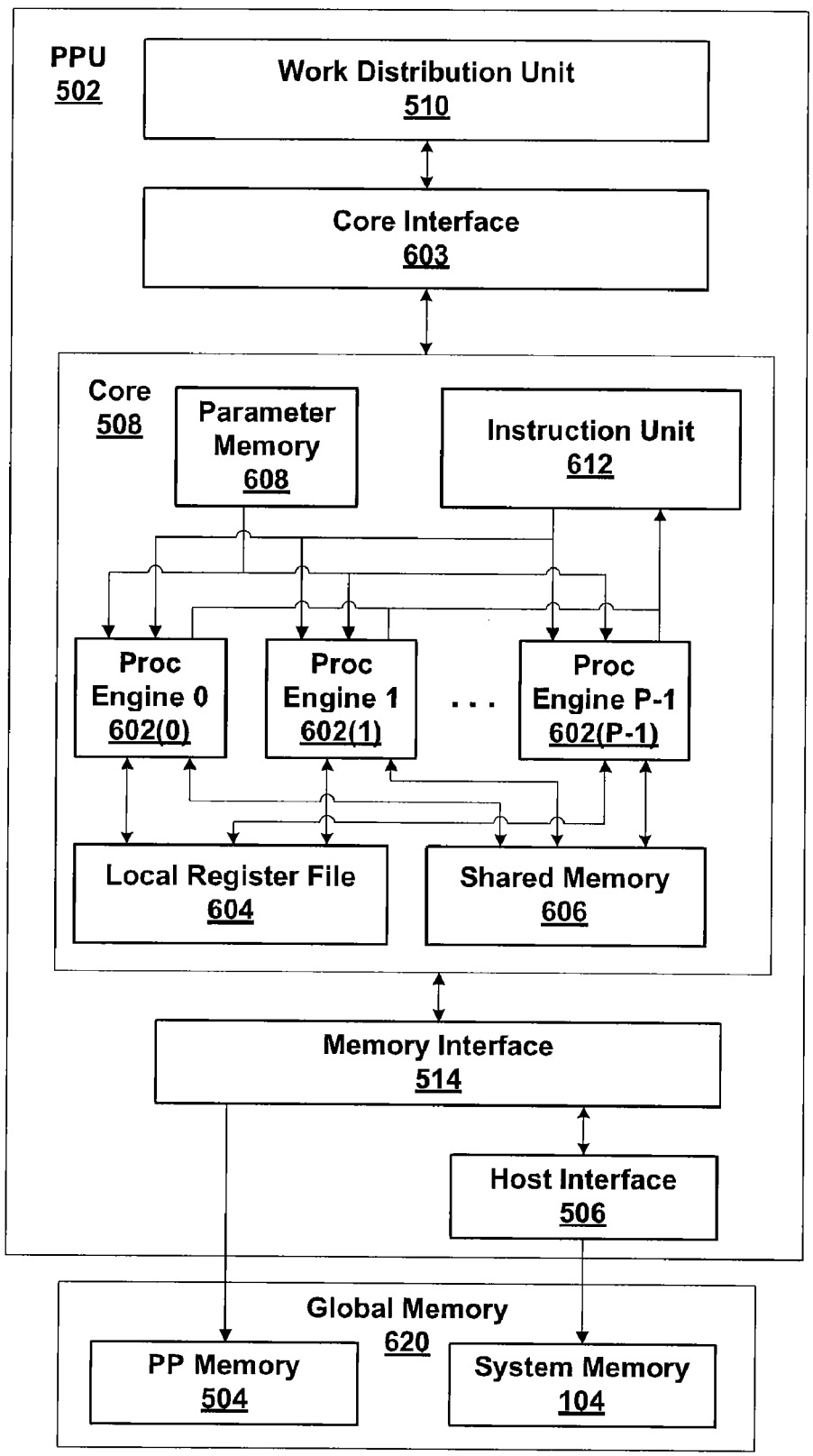
FIG. 6 is a block diagram of a parallel processing unit for the parallel processing subsystem of FIG. 5 in accordance with one or more aspects of the present invention.

FIG. 6 is a block diagram of a parallel processing unit 520 for the parallel processing subsystem 412 of FIG. 5, in accordance with one or more aspects of the present invention. PPU 502 includes a core 508 (or multiple cores 508) configured to execute a large number of threads in parallel, where the term "thread" refers to an instance of a program executing on a particular set of input data. In some embodiments, single-instruction, multiple-data (SIMD) instruction issue techniques are used to support parallel execution of a large number of threads without providing multiple independent instruction units.

In one embodiment, each core 508 includes an array of P (e.g., 8, 16, etc.) parallel processing engines 602 configured to receive SIMD instructions from a single instruction unit 612. Each processing engine 602 advantageously includes an identical set of functional units (e.g., arithmetic logic units, etc.). The functional units may be pipelined, allowing a new instruction to be issued before a previous instruction has finished, as is known in the art. Any combination of functional units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

Each processing engine 602 uses space in a local register file (LRF) 604 for storing its local input data, intermediate results, and the like. In one embodiment, local register file 604 is physically or logically divided into P lanes, each having some number of entries (where each entry might store, e.g., a 32-bit word). One lane is assigned to each processing engine 602, and corresponding entries in different lanes can be populated with data for different threads executing the same program to facilitate SIMD execution. In some embodiments, each processing engine 602 can only access LRF entries in the lane assigned to it. The total number of entries in local register file 604 is advantageously large enough to support multiple concurrent threads per processing engine 602.

Each processing engine 602 also has access to an on-chip shared memory 606 that is shared among all of the processing engines 602 in core 508. Shared memory 606 may be as large as desired, and in some embodiments, any processing engine 602 can read to or write from any location in shared memory 606 with equally low latency (e.g., comparable to accessing local register file 604). In some embodiments, shared memory 606 is implemented as a shared register file; in other embodiments, shared memory 606 can be implemented using shared cache memory.

In addition to shared memory 606, some embodiments also provide additional on-chip parameter memory and/or cache (s) 608, which may be implemented, e.g., as a conventional RAM or cache. Parameter memory/cache 608 can be used, e.g., to hold state parameters and/or other data (e.g., various constants) that may be needed by multiple threads. Processing engines 602 also have access via memory interface 514 to off-chip "global" memory 620, which can include, e.g., PP memory 504 and/or system memory 404, with system memory 404 being accessible by memory interface 514 via host interface 506 as described above. It is to be understood that any memory external to PPU 502 may be used as global memory 620. Processing engines 602 can be coupled to memory interface 514 via an interconnect (not explicitly shown) that allows any processing engine 602 to access global memory 620.

In one embodiment, each processing engine 602 is multi-threaded and can execute up to some number G (e.g., 24) of threads concurrently, e.g., by maintaining current state information associated with each thread in a different portion of its assigned lane in local register file 604. Processing engines 602 are advantageously designed to switch rapidly from one thread to another so that instructions from different threads can be issued in any sequence without loss of efficiency.

Instruction unit 612 is configured such that, for any given processing cycle, a single instruction (INSTR) is issued to all P processing engines 602, such that core 508 implements a P-way SIMD microarchitecture. Since each processing engine 602 is also multithreaded, supporting up to G threads concurrently, core 508 in this embodiment can have up to P*G threads executing concurrently. For instance, if P=16 and G=24, then core 508 supports up to 384 concurrent threads. When executing shader programs that are configured to process volumetric data and produce tessellated iso-surfaces, each thread can compute scalar values, gradient values, iso-surface intersections, and intersection patterns for one or more slices in parallel.

Operation of core 508 is advantageously controlled via a core interface 603. In some embodiments, core interface 603 receives data to be processed (e.g., primitive data, vertex data, and/or pixel data) as well as state parameters and commands defining how the data is to be processed (e.g., what program is to be executed) from work distribution unit 510. Core interface 603 can load data to be processed into shared memory 606 and parameters into parameter memory 608. When execution of a program is completed, core 508 advantageously notifies core interface 603. Core interface 603 can then initiate other processes, e.g., to retrieve output data from shared memory 606 and/or to prepare core 508 for execution of additional programs.

It will be appreciated that the core architecture described herein is illustrative and that variations and modifications are possible. Any number of processing engines may be included. In some embodiments, each processing engine 602 has its own local register file, and the allocation of local register file entries per thread can be fixed or configurable as desired. In particular, entries of local register file 604 may be allocated for processing each program. Further, while only one core 508 is shown, a PPU 502 may include any number of cores 508, which are advantageously of identical design to each other so that execution behavior does not depend on which core 508 receives a particular processing task. Each core 508 advantageously operates independently of other cores 508 and has its own processing engines, shared memory, and so on.

Thread Arrays and Cooperative Thread Arrays

In some embodiments, multithreaded processing core 508 of FIG. 6 can execute general-purpose computations using thread arrays. As used herein, a "thread array" is a group consisting of a number (n0) of threads that concurrently execute the same program on an input data set to produce an output data set. Each thread in the thread array is assigned a unique thread identifier ("thread ID") that is accessible to the thread during its execution. The thread ID controls various aspects of the thread's processing behavior. For instance, a thread ID may be used to determine which portion of the input data set a thread is to process and/or to determine which portion of an output data set a thread is to produce or write.

In some embodiments, the thread arrays are "cooperative" thread arrays, or CTAs. As with other types of thread arrays, a CTA is a group of multiple threads that concurrently execute the same program (referred to herein as a "CTA program") on an input data set to produce an output data set. In a CTA, the threads can cooperate by sharing data with each other in a manner that depends on thread ID. For instance, in a CTA, data can be produced by one thread and consumed by another. In some embodiments, synchronization instructions can be inserted into the CTA program code at points where data is to be shared to ensure that the data has actually been produced by the producing thread before the consuming thread attempts to access it. In some embodiments, threads in a CTA share input data, such as cube corner scalar values and/or intermediate results with other threads in the same CTA using shared memory 606 of FIG. 6. The extent, if any, of data sharing among threads of a CTA is determined by the CTA program; thus, it is to be understood that in a particular application that uses CTAs, the threads of a CTA might or might not actually share data with each other, depending on the CTA program.

For example, a CTA program might include an instruction to compute an address in shared memory 606 to which particular data is to be written, with the address being a function of thread ID. Each thread computes the function using its own thread ID and writes to the corresponding location. The address function is advantageously defined such that different threads write to different locations; as long as the function is deterministic, the location written to by any thread is predictable. The CTA program can also include an instruction to compute an address in shared memory 606 from which data is to be read, with the address being a function of thread ID. By defining suitable functions and providing synchronization techniques, data can be written to a given location in shared memory 606 by one thread of a CTA and read from that location by a different thread of the same CTA in a predictable manner. Consequently, any desired pattern of data sharing among threads can be supported, and any thread in a CTA can share data with any other thread in the same CTA.

CTAs (or other types of thread arrays) are advantageously employed to perform computations that lend themselves to data-parallel decomposition. As used herein, a "data-parallel decomposition" includes any situation in which a computational problem is solved by executing the same algorithm multiple times in parallel on input data to generate output data; for instance, one common instance of data-parallel decomposition involves applying the same processing algorithm to different portions of an input data set in order to generate different portions an output data set. Examples of problems amenable to data-parallel decomposition include scalar field value computations, gradient field value computations, matrix algebra, linear and/or nonlinear transforms in any number of dimensions (e.g., Fast Fourier Transforms), and various filtering algorithms including convolution filters in any number of dimensions, separable filters in multiple dimensions, and so on. The processing algorithm to be applied to each portion of the input data set is specified in the CTA program, and each thread in a CTA executes the same CTA program on one portion of the input data set. A CTA program can implement algorithms using a wide range of mathematical and logical operations, and the program can include conditional or branching execution paths and direct and/or indirect memory access.

For example, as is known in the art, an array of data values (e.g., pixels) can be filtered using a 2-D kernel-based filter algorithm, in which the filtered value of each pixel is determined based on the pixel and its neighbors. In some instances the filter is separable and can be implemented by computing a first pass along the rows of the array to produce an intermediate array, then computing a second pass along the columns of the intermediate array. In one CTA implementation of a separable 2-D filter, the threads of the CTA load the input data set (or a portion thereof) into shared memory 606, then synchronize. Each thread performs the row-filter for one point of the data set and writes the intermediate result to shared memory 606. After all threads have written their row-filter results to shared memory 606 and have synchronized at that point, each thread performs the column filter for one point of the data set. In the course of performing the column filter, each thread reads the appropriate row-filter results from shared memory 606, and a thread may read row-filter results that were written by any thread of the CTA. The threads write their column-filter results to shared memory 606. The resulting data array can be stored to global memory or retained in shared memory 606 for further processing. Where shared memory 606 can be accessed with lower latency and/or greater bandwidth than global memory, storing intermediate results in shared memory 606 advantageously improves processor throughput.

In one embodiment, a driver program executing on CPU 402 of FIG. 4 writes commands defining the CTA to a pushbuffer (not explicitly shown) in memory (e.g., system memory 404), from which the commands are read by a PPU 502. The commands advantageously are associated with state parameters such as the number of threads in the CTA, the location in global memory 620 of an input data set to be processed using the CTA, the location in global memory 620 of the CTA program to be executed, and the location in global memory 620 where output data is to be written. The state parameters may be written to the pushbuffer together with the commands. In response to the commands, core interface 603 loads the state parameters into core 508 (e.g., into parameter memory 608), then begins launching threads until the number of threads specified in the CTA parameters have been launched. In one embodiment, core interface 603 assigns thread IDs sequentially to threads as they are launched. More generally, since all threads in a CTA execute the same program in the same core 508, any thread can be assigned any thread ID, as long as each valid thread ID is assigned to only one thread. Any unique identifier (including but not limited to numeric identifiers) can be used as a thread ID. In one embodiment, if a CTA includes some number ($n_0$) of threads, thread IDs are simply sequential (one-dimensional) index values from 0 to $n_0-1$. In other embodiments, multidimensional indexing schemes can be used. It should be noted that as long as data sharing is controlled by reference to thread IDs, the particular assignment of threads to processing engines will not affect the result of the CTA execution. Thus, a CTA program can be independent of the particular hardware on which it is to be executed.

Graphics Pipeline Architecture

Figure 7:
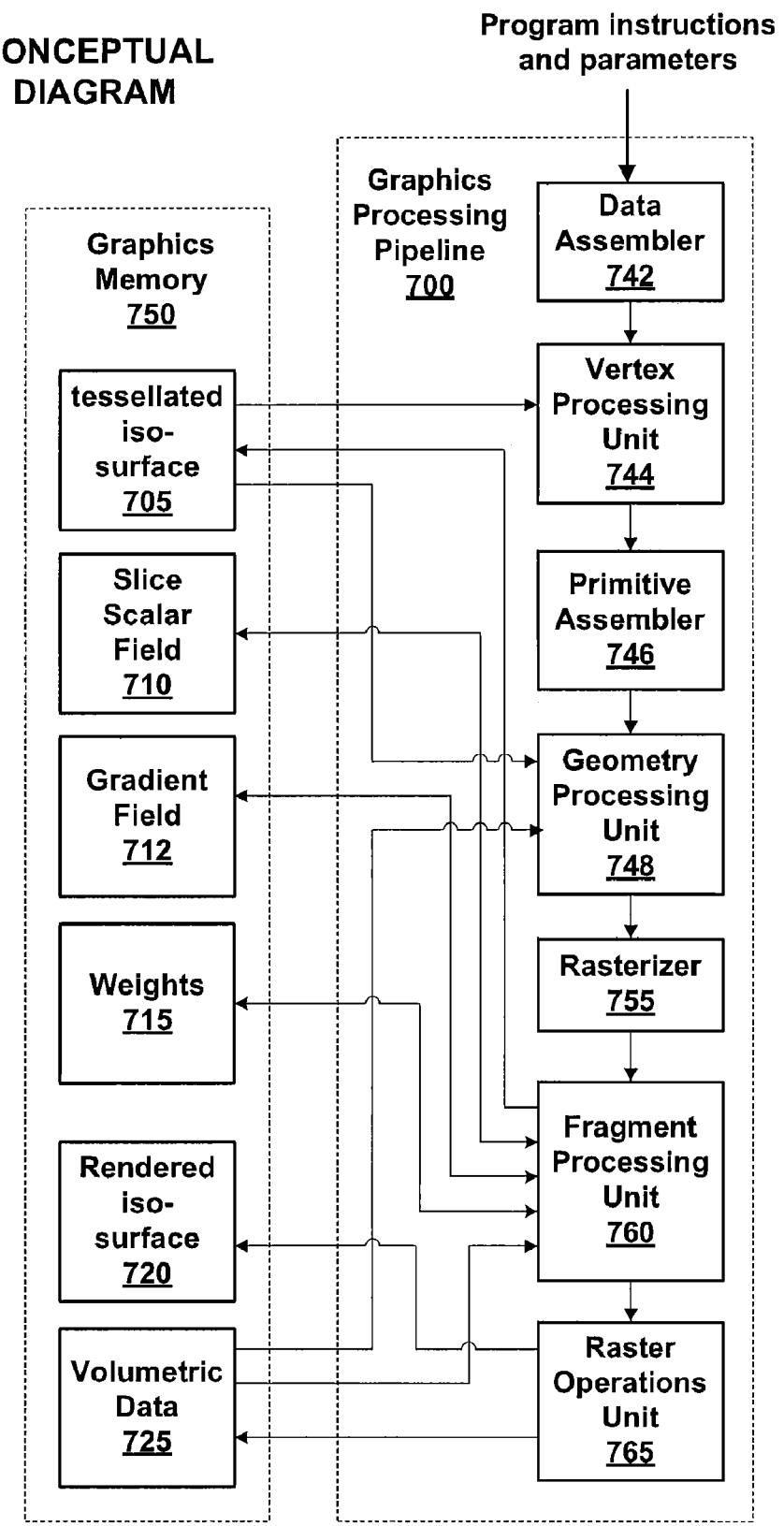
FIG. 7 is a conceptual diagram of a graphics processing pipeline in accordance with one or more aspects of the present invention.

FIG. 7 is a conceptual diagram of a graphics processing pipeline 700, in accordance with one or more aspects of the present invention. PPU 502 may be configured to form a graphics processing pipeline 700. For example core 508 may be configured to perform the functions of a vertex processing unit 744, geometry processing unit 748, and a fragment processing unit 760. The functions of data assembler 742, primitive assembler 746, rasterizer 755, and raster operations unit 765 may also be performed by core 508 or may be performed by host interface 506.

Data assembler 742 is a fixed function unit that collects vertex data for high-order surfaces, primitives, and the like, and outputs the vertex data to vertex processing unit 744. Data assembler 742 receives a stream of shader program instructions and parameters for processing. For example, data assembler 742 can receive a stream of shader program instructions and parameters associated with a volumetric description and produce a render target storing volumetric data 725. Graphics memory 750 includes system memory 404 and/or PP memory 504 and is used to store one or more render targets produced by a PPU 502 configured to perform one or more functions of graphics processing pipeline 700. For example, graphics memory 750 stored render targets containing volumetric data 725, slice scalar field 710, gradient field 712, weights 715, tessellated iso-surface 705, and rendered iso-surface 720.

Vertex processing unit 744 is a programmable execution unit that is configured to execute vertex shader programs, transforming vertex data as specified by the vertex shader programs. For example, vertex processing unit 744 may be programmed to transform the vertex data from an object-based coordinate representation (object space) to an alternatively based coordinate system such as world space or normalized device coordinates (NDC) space. Vertex processing unit 744 may read data that is stored in PP memory 504, such as a tessellated iso-surface 705 stored in a render target, through memory interface 514 for processing according to a vertex shader program.

Primitive assembler 746 receives processed vertex data from vertex processing unit 744 and constructs graphics primitives, e.g., points, lines, triangles, or the like, for processing by geometry processing unit 748. Geometry processing unit 748 is a programmable execution unit that is configured to execute geometry shader programs, transforming graphics primitives received from primitive assembler 746 as specified by the geometry shader programs. For example, geometry processing unit 748 may be programmed to subdivide the graphics primitives into one or more new graphics primitives and calculate parameters, such as plane equation coefficients, that are used to rasterize the new graphics primitives. Geometry processing unit 748 outputs the parameters and new graphics primitives to rasterizer 755. Geometry processing unit 748 may read data that is stored in PP memory 504, such as tessellated iso-surface 705 or volumetric data 725, through memory interface 514 for use in processing the geometry data.

Rasterizer 755 scan converts the graphics primitives and outputs fragments and coverage data to fragment processing unit 560. Fragment processing unit 760 is a programmable execution unit that is configured to execute fragment shader programs, transforming fragments received from rasterizer 755 as specified by the fragment shader programs. For example, fragment processing unit 760 may be programmed to perform operations such as perspective correction, texture mapping, shading, blending, and the like, to produce shaded fragments that are output to raster operations unit 765. Specifically, fragment processing unit 760 can be configured to compute slice sample values, gradients, and weights.

Fragment processing unit 760 may read data that is stored in PP memory 504, such as slice scalar field 710, gradient field 712, weights 715, and volumetric data 725, through memory interface 514 for use in processing the fragment data. Memory interface 514 produces read requests for data stored in graphics memory, decompresses any compressed data, and performs texture filtering operations, e.g., bilinear, trilinear, anisotropic, and the like. Fragment processing unit 760 may also write data to render targets in graphics memory 750, such as slice scalar field 710, gradient field 712, weights 715, and volumetric data 725, and tessellated iso-surface 705.

Raster operations unit 765 is a fixed function unit that optionally performs near and far plane clipping and raster operations, such as stencil, z test, and the like, and outputs pixel data as processed graphics data for storage in graphics memory. Raster operations unit 765 writes the data to one or more render targets in graphics memory 750, including volumetric data 725 and rendered iso-surface 720. In some embodiments of the present invention, data output by fragment processing unit 760 is written to a render target via raster operations unit 765, such as slice scalar field 710, gradient field 712, weights 715, and volumetric data 725, and tessellated iso-surface 705. The processed graphics data stored in graphics memory can be output for display on display device 410.

Optimized Tessellation of Volumetric Data

Figure 8:
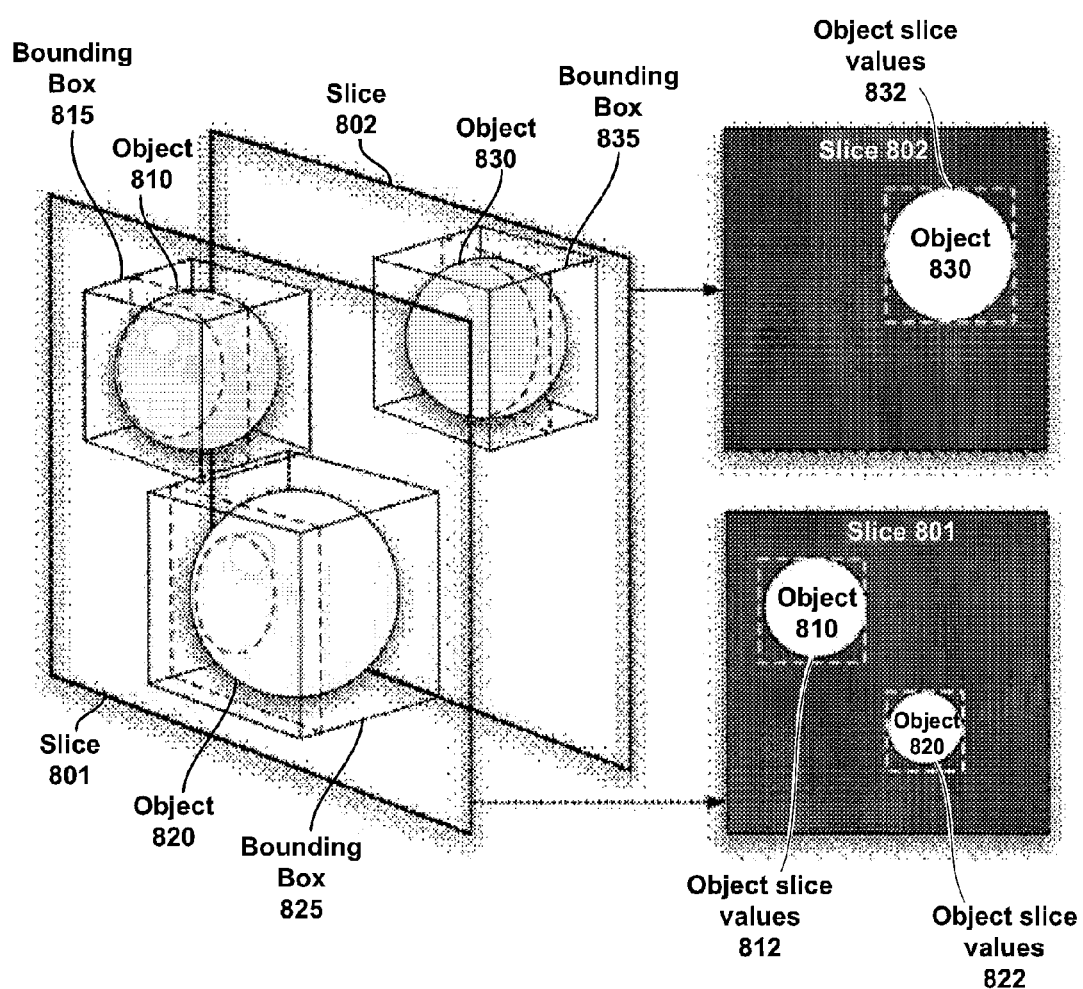
FIG. 8 illustrates a conceptual diagram of using bounding boxes to produce slices of values sampled from volumetric data in accordance with one or more aspects of the present invention.

The processing effort required to produce scalar slices and gradient slices can be reduced by only processing portions of the volumetric data where objects are present. FIG. 8 illustrates a conceptual diagram of using bounding boxes to produce slices of values sampled from volumetric data, including objects 810, 820, and 830, in accordance with one or more aspects of the present invention. Bounding boxes 815, 825, and 835 are determined using techniques known to those skilled in the art. Bounding boxes 815, 825, and 835 are used to limit the processing of the volumetric description containing objects 810, 820, and 830 to those portions of slices 801 and 802 that lie within a boundary of bounding boxes 815, 825, or 835. Therefore, in order to produce object slice values 812 and 822 of slice 801 only the portions of volumetric data that lie within bounding boxes 815 and 825 are processed. Bounding boxes 815 and 825 define clipping rectangles for slice 801 and bounding box 835 defines a clipping rectangle for slice 802. Similarly, slice 802 intersects object 830, resulting in object slice values 832. Again, in order to produce object slice values 832 of slice 802 only the portions of volumetric data that lie within bounding box 835 are processed. In other embodiments of the present invention, bounding spheres or other bounding surfaces are used to indicate portions of the volumetric data that should be processed.

Although the slices are typically positioned with regular spacing along the z axis in world space to produce the scalar slices and gradient slices, in some cases it is desirable to position the slices along a different axis or with varying spacing. A slice can be defined as functions of x, y, and z coordinates by any plane equation. For example, the slices can be aligned along the z axis in camera space to produce a view-dependent iso-surface tessellation. The spacing between the slice can increase as the distance from the camera increases to produce more detail near the camera and less detail further from the camera. Varying the spacing in this manner is particularly useful when real-time tessellation is performed that requires a different tessellation for each frame. In other embodiments of the present invention, the x and y scale of each slice varies, increasing as the distance from the camera increases to produce a perspective-corrected tessellation in order to provide more detail close to the viewpoint and less detail further from the viewpoint.

Figure 9:
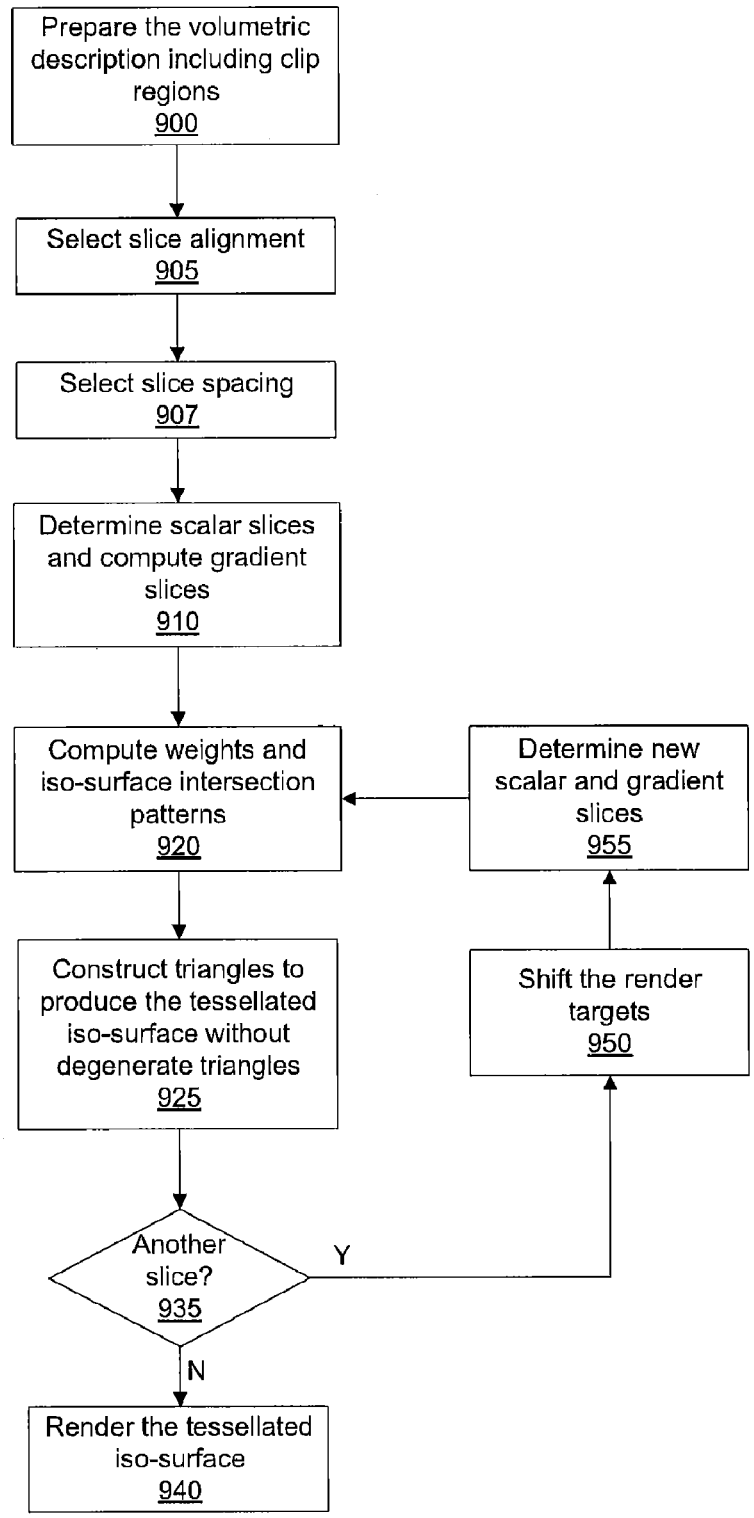
FIG. 9 is another flow diagram of method steps for producing a tessellated iso-surface from a volumetric description in accordance with one or more aspects of the present invention.

FIG. 9 is another flow diagram of method steps for producing a tessellated iso-surface from a volumetric description, in accordance with one or more aspects of the present invention. In step 900 the volumetric description is prepared, including generation of bounding boxes for use as clip regions during execution of shader programs. As previously described the volumetric description can be generated by the multi-threaded graphics processor, e.g., parallel processing subsystem 412, or the volumetric description can be provided directly, such as a 3D texture that is aligned with the slices.

In step 905 a slice alignment is selected and specified by a shader program for processing of the volumetric data. As previously described, the z axis can be aligned according to the world space, camera space, or another space. In step 907 a slice spacing is selected and specified by the shader program for processing of the volumetric data. A regular, equal spacing can be used or the spacing may vary as a function of z or another variable.

In step 910 samples for first, second, and third scalar slices are determined by parallel processing subsystem 412 and stored as first, second, and third render targets, e.g., slice scalar field 710, as described in conjunction with step 305 of FIG. 3. In step 910 parallel processing subsystem 412 also reads the first, second, and third render targets and computes a first and second gradient slice, e.g., gradient field 712, as described in conjunction with step 310 of FIG. 3. In step 920 parallel processing subsystem 412 computes weights corresponding to the intersections of the iso-surface with each axis, x, y, and z, e.g., weights 715, and computes the iso-surface intersection pattern, according to the marching cube algorithm, as described in conjunction with steps 315 and 320.

As previously described in conjunction with FIG. 3, degenerate triangles are produced for each cube that has fewer than 5 triangles, according to the pattern shown in FIG. 1B. The generate triangles don't appear in a rendered image. For example, when the pattern specifies that 2 triangles are needed for the iso-surface intersection with the cube, 3 degenerate triangles are produced. Removing the degenerate triangles reduces the number of triangles stored in tessellated iso-surface 705. Removing the degenerate triangles prior to rendering may improve the processing throughput of triangles that contribute to the final image since the degenerate triangles are not processed prior to culling them following primitive assembly. Therefore, processing efficiency for rendering the triangles is improved since less data needs to be read and processed to produce the rendered iso-surface 720. In step 925 parallel processing subsystem 412 executes a geometry shader program to construct triangles using the intersection patterns, scalar fields (e.g., slice scalar field 710), and weights 715 to produce tessellated iso-surface 705 that does not include degenerate triangles. Execution of the geometry shader program effectively removes the degenerate triangles from the tessellated iso-surface 705. In some embodiments of the present invention, tessellated iso-surface 705 (without the degenerate triangles) is stored in system memory 404 for use at a later time.

In step 935 parallel processing subsystem 412 determines if another slice should be processed for the volumetric description, and, if so, in step 950 parallel processing subsystem 412 effectively shifts the third and second render targets storing scalar values, e.g., slice scalar field 710, so that they are used as the second and first render targets, respectively. In step 950 parallel processing subsystem 412 also shifts the second gradient render target so that it is used as the first gradient render target. In step 955 parallel processing subsystem 412 determines a new scalar and gradient slice and returns to step 920 to produce a new third render target and a new second gradient render target.

If, in step 935 parallel processing subsystem 412 determines that another slice should not be processed for the volumetric description, then in step 940 parallel processing subsystem 412 renders tessellated iso-surface 705 to produce rendered iso-surface 720 that is stored in a render target. In other embodiments of the present invention, tessellated iso-surface 705 is stored and output for rendering at a later time by parallel processing subsystem 412 or another processing device.

A multi-threaded graphics processor is configured to generate a tessellated iso-surface from a volumetric description using slices of values that are stored in render targets in order to offload the tessellation computations from the CPU. The volumetric description can be a complex mathematic equation, a sum of metaballs, a pre-computed scalar field represented as a 3D volume texture, a combination of many small 3D volumes, or a rendered volume. A rendered volume can be the result of combining several 3D volumes and storing scalar fields. The volumetric description may also include other parameters, such as vectors used to compute normals of an iso-surface. The multi-threaded graphics processor may be used to process the volumetric description and produce the volumetric data.

Slices are aligned along an axis and spaced before being intersected with the volume to determine sample values for the slices. The computations needed to determine the sample values may be reduced by using bounding boxes to define regions (clipping rectangles) of the volumetric data where the iso-surface exists. The computations for multiple cube positions within adjacent slices may be performed in parallel by the multi-threaded graphics processor and stored in render targets. Slice alignment, dimensions, and spacing may be varied according to a shader program.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

The invention claimed is:

1. A method for generating a tessellated iso-surface from a volumetric description, comprising:
preparing the volumetric description to provide volumetric data;
computing weights corresponding to edges between vertices positioned at intersections of the volumetric data and edges of cubes in a cube array formed by a first slice intersecting the volumetric data and a second slice intersecting the volumetric data;
storing the weights in a render target in a graphics memory;
determining iso-surface intersection patterns for the cube array;
constructing triangles using the weights and the iso-surface intersection patterns to produce the tessellated iso-surface triangles; and
storing the triangles in a manner allowing retrieval of the tessellated iso-surface.

2. The method of claim 1, wherein the volumetric data includes a first scalar field and a second scalar field representing samples of the volumetric description at corners of the cubes in the cube array, and the first scalar field is stored in the graphics memory as a first render target and the second scalar field is stored in the graphics memory as a second scalar render target.

3. The method of claim 2, further comprising the steps of:
computing a first gradient field as a difference between the second scalar field and the first scalar field;
computing a second gradient field as a difference between a third scalar field and the second scalar field;
storing the first gradient field as a first gradient render target in the graphics memory; and
storing the second gradient field as a second gradient render target in the graphics memory.

4. The method of claim 1, wherein a slice alignment relative to x, y, and z axes is specified by a shader program to align the first slice and the second slice relative to the volumetric data.

5. The method of claim 1, wherein a slice spacing is specified by a plane equation that is a function of x, y, and z coordinates.

6. The method of claim 1, further comprising the step of rendering the tessellated iso-surface to produce an image of the iso-surface for display.

7. The method of claim 1, wherein the tessellated iso-surface does not include degenerate triangles.

8. The method of claim 1, wherein the step of preparing the volumetric description includes executing a shader program to evaluate a mathematic equation that specifies the volumetric data.

9. The method of claim 1, wherein the step of preparing the volumetric description includes executing a shader program to combine three-dimensional volume textures and produce the volumetric data.

10. A system for generating a tessellated iso-surface from a volumetric description, comprising:
a memory configured to store a first gradient render target, a second gradient render target, a weight render target, and a tessellated iso-surface; and
a parallel processing unit coupled to the memory and configured to simultaneously process volumetric data representing the volumetric description by:
preparing the volumetric description to provide volumetric data;
computing weights using the first gradient render target and the second gradient render target, the weights corresponding to edges between vertices positioned at intersections of the volumetric data and edges of cubes in a cube array formed by a first slice intersecting the volumetric data and a second slice intersecting the volumetric data;
storing the weights in the weight render target;
determining iso-surface intersection patterns for the cube array;
constructing triangles using the weights and the iso-surface intersection patterns to produce the tessellated iso-surface; and
storing the tessellated iso-surface in the memory.

11. The system of claim 10, wherein the parallel processing unit is configured according to a shader program to produce the first and second gradient render targets from a first scalar field sampled using the first slice, a second scalar field sampled using the second slice, and a third scalar field sampled using a third slice.

12. The system of claim 10, wherein the parallel processing unit is further configured according to a geometry program to produce the tessellated iso-surface without constructing degenerate triangles.

13. The system of claim 10, wherein the parallel processing unit is further configured to process the volumetric description according to a shader program to produce the volumetric data.

14. The system of claim 10, wherein the parallel processing unit is further configured to process the tessellated iso-surface render target according to a shader program to produce a rendered iso-surface for display.

15. A computer-readable medium containing instructions for controlling a computer system to generate a tessellated iso-surface from a volumetric description, comprising:
preparing the volumetric description to provide volumetric data;
computing weights corresponding to vertices positioned at intersections of the volumetric data and edges of cubes in a cube array formed by a first slice intersecting the volumetric data and a second slice intersecting the volumetric data;
storing the weights in a graphics memory;

determining iso-surface intersection patterns for the cube array;

constructing triangles using the weights and the iso-surface intersection patterns to produce the tessellated iso-surface; and storing the triangles in a manner allowing retrieval of the tessellated iso-surface.

16. The computer-readable medium of claim 15, further comprising specifying a bounding surface that encloses regions of a three-dimensional volume where the volumetric data is present.

17. The computer-readable medium of claim 15, wherein the volumetric data includes a first scalar field, a second scalar field representing samples of the volumetric description at corners of the cubes in the cube array, and the first scalar field is stored in the graphics memory as a first render target and the second scalar field is stored in the graphics memory as a second scalar render target.

18. The computer-readable medium of claim 17, further comprising shifting the second scalar field to use the second scalar field as the first scalar field to define an additional array of cubes formed by the second scalar field and a third scalar field.

19. The computer-readable medium of claim 15, further comprising varying spacing between the first slice and the second slice based on a distance from a camera and each slice.

20. The computer-readable medium of claim 15, further comprising varying dimensions of the first slice and the second slice based on a distance from a camera and the first slice and the second slice.

* * * * *